United States Patent [19]

Martin et al.

[11] 4,194,315
[45] Mar. 25, 1980

[54] RETRACTABLE FISH STRINGER

[76] Inventors: Michael G. Martin, Box 142; Ronald M. Carver, 405 S. Jefferson; James E. Cafer, 210 S. Main, all of Vandalia, Mo. 63382

[21] Appl. No.: 917,796

[22] Filed: Jun. 22, 1978

[51] Int. Cl.² .............................................. A01K 65/00
[52] U.S. Cl. ........................................................ 43/55
[58] Field of Search .................... 43/43.11, 54.5 R, 55; 224/7 R–7 E, 5 F, 28 E; 242/107.3, 107.6, 84.3; 70/456 R, 456 B, 457, 458, 459

[56] References Cited

U.S. PATENT DOCUMENTS

| | | | |
|---|---|---|---|
| 2,804,247 | 8/1957 | Gallagher | 224/7 D |
| 2,942,800 | 6/1960 | Torbett | 242/107.3 X |
| 3,233,591 | 2/1966 | Rogers | 242/107.3 X |
| 4,124,154 | 11/1978 | D'Russa | 224/7 |

Primary Examiner—Nicholas P. Godici
Attorney, Agent, or Firm—Schmidt, Johnson, Hovey & Williams

[57] ABSTRACT

A fish stringer for temporarily storing captured fish in the water, has a recoil mechanism operatively coupled with the hook-supporting line of the stringer to permit selective extension and retraction of the line in accordance with the needs of the angler. The multiple fish-securing hooks in the stringer are shiftably attached to the line for sliding movement along the length of the latter whereby the hooks may be segregated from recoiled portions of the line. In preferred forms, the recoil mechanism is stored within a housing having a line-accommodating passageway formed therein of a dimension sufficient to preclude the hooks from entering the housing. A retainer clip on the housing holds the hooks in a convenient out of the way position until such time as they may be required for retaining fish.

10 Claims, 4 Drawing Figures

U.S. Patent   Mar. 25, 1980   4,194,315
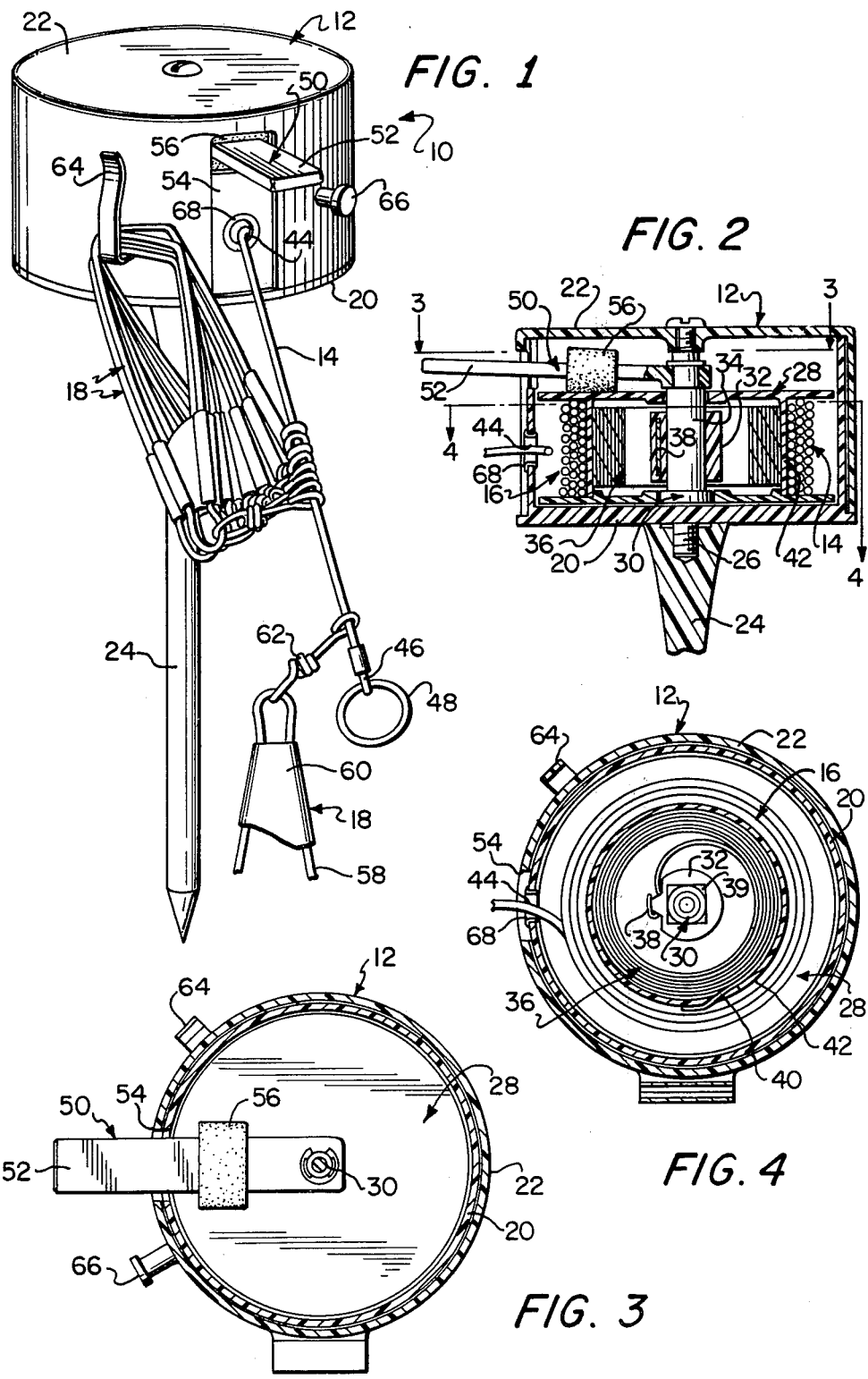

RETRACTABLE FISH STRINGER

TECHNICAL FIELD

This invention relates to fishing equipment generally and is particularly concerned with a fish stringer having mechanism permitting selective extension and retraction of the stringer line.

BACKGROUND ART

Fish stringers for captively restraining fish after they are caught by anglers are well known in the art. Such stringers typically comprise a length of flexible chain or rope having a plurality of fish-holding hooks mounted on the chain at spaced locations therealong. Of course, the main function of fish stringers is to permit caught fish to be returned to the water for convenient restrained storage while the angler continues fishing. Hence, it is customary to secure one end of the stringer to a stationary support with the remaining portions of the stringer positioned for submersion in the body of water. As fish are caught, the angler simply removes the stringer from the water, attaches the fish to an appropriate hook, and returns the stringer to the water for safe storage of the fish until such time as they are cleaned.

Another type of fish stringer is the simple line stringer comprising a rope having a retainer at one end and a skewer on the opposite end. Fish are simply threaded onto the line stringer as they are caught; attachment for the line stringer may be made in any convenient manner.

Though the fish stringer has long been a effective and dependable tool for the angler, certain problems still persist with the use of these devices. In the case of stringers provided with separate fish-engaging hooks or other attachment means, it is not uncommon to have the stringer become hopelessly tangled when it is stored for example in the fisherman's tackle box. Though the problem is not as acute with the line-type stringers, these devices may nevertheless become knotted or entangled with other fishing equipment during storage and use.

A second, perhaps more critical problem exists with the use of fish stringers by bank fisherman. In this regard, some of the finest fishing spots in the world are wholly unaccessible by boat and can be reached only on foot often over rugged terrain. Further in this regard, it is not uncommon for a bank fisherman to fish a creek or stream at a location on the bank well above the water. This for the reason that the lay of the land around many good fishing holes is simply too irregular to permit fishing immediately adjacent the water as would be preferable. In such instances, it will be appreciated that it may be difficult if not impossible for the bank fisherman to conveniently secure his stringer close enough to the water to effect desired submersion of the stringer line. Simply increasing the length of conventional stringers to reach the water from remote bank fishing locations is not practical since the angler would be required to drag his stringer and attached fish a relatively long distance over rough terrain each time he catches a fish.

DISCLOSURE OF THE INVENTION

The present invention overcomes the problems described above by the provision of a stringer having a recoil mechanism for the stringer line whereby the latter may be selectively extended or retracted in accordance with prevailing fishing conditions. An extra long length of stringer line is provided such that even remote water areas may be easily reached by simply extending the stringer to its full length.

The discrete fish-engaging hooks of the stringer are slidably attached to the line for permitting extension and retraction of the latter independently of the hooks. A housing for the recoil mechanism has a retaining clip for the hooks whereby they may be conveniently stored at a single location until such time as they are needed for engaging a fish.

The housing for the recoil mechanism has mounting structure for anchoring the stringer in the ground, and may alternatively be provided with other structure for engaging a boat, dock or similar supporting objects. The housing also has a line tie engageable by the stringer line for positively holding the latter in a desired extended position.

BRIEF DESCRIPTION OF THE DRAWING

In the drawing:

FIG. 1 is a perspective view of a retractable fish stringer constructed in accordance with the principles of the present invention;

FIG. 2 is a fragmentary, cross-sectional view of the stringer taken along a vertical plane passing through its normally upright axis;

FIG. 3 is a cross-sectional view taken along line 3—3 of FIG. 2; and

FIG. 4 is a cross-sectional view taken along line 4—4 of FIG. 2.

BEST MODE FOR CARRYING OUT THE INVENTION

There is shown in FIG. 1 a retractable fish stringer 10 comprising a hollow cylindrical housing 12, a length of flexible line 14 supported upon a recoil mechanism 16 within the housing 12, and a plurality of fish securements or swivel hooks 18 slidably retained on the line 14 exteriorly of the housing 12. It is anticipated that all components of the stringer 10 be constructed of corrosion resistant materials to retard deterioration from repeated exposure to water, dirt, and the physical elements.

The housing 12 comprises a cylindrical tubular base member 20 adapted to be telescopically received within a upper tubular cover 22 as shown for example in FIG. 2. An elongate, ground-engaging spike depends from the base member 20 in generally axially aligned relation thereto for providing a convenient means to secure the stringer 10 during use. It is to be understood that other types of mounts might be provided for the housing 12 to render the stringer 10 readily attachable to securing structure such as the side of a boat or a fishing dock. To this end, there is provided a threaded coupling 26 releasably attaching the spike 24 to the member 20 to permit disengagement of these components for substitution of other attaching mounts.

In further detail, the recoil mechanism 16 includes a line-receiving spool 28 rotatably supported on a stationary, stepped shaft 30 centrally disposed within the housing 12 in general axial alignment with the member 20 and cover 22. The spring anchor 32 is fixedly attached to the shaft 30 on a squared section 34 of the latter intermediate the ends of the spool 28 as best shown in FIG. 2. Motive power for the recoil mechanism is provided by a spiral watch-type spring 36 having an inner end 38 secured to the shaft 30 by the anchor 32 and an outer end 40 secured to the barrel portion 42 of the spool 28. The arrangement of the spring 36 relative to the spool 28 is such that the latter is yieldably biased against movement in the clockwise direction as viewed in FIG. 4.

The line 14 has one end secured to the spool 28 and is wound around the barrel portion 42 in a clockwise direction from the secured end as viewed in FIG. 4 to present a coil capable of being unwound and rewound in response to movement of the spool 28. The line 14 emerges from the housing 12 through an aperture 44 formed in the sidewall of the base member 20. The outermost end 46 of the line 14 has a finger engageable ring 48 attached thereto to provide a convenient means for manually withdrawing the line 14 from the housing 12 by unwinding the coil supported on the spool 28. Preferably, the ring 48 is sufficiently large to preclude its passage through the aperture 44 such that the end 46 of the line 14 is prevented from being retracted into the housing 12 by action of the recoil mechanism 16.

A brake 50 for the recoil mechanism 16 is provided to selectively retain the spool 28 against the biasing of the spring 36 such that when a desired length of line 14 is withdrawn from the housing 12, the mechanism 16 does not automatically retract the line 14. The brake 50 comprises a resilient lever 52 extending radially from the shaft 30 and projecting outwardly from the housing 12 through a cutout 54 in the cover 22. A friction member 56 carried on the lever 52 is yieldably biased against one end of the spool 28 as shown for example in FIG. 2. Biasing of the friction member 56 is effected because the lever 52 is slightly flexed upwardly when the components are disposed as shown in FIG. 2 thereby creating a downward force tending to push the member 56 against the spool 28. Of critical importance to the invention herein is the relationship between the force applied to the spool 28 by the brake 50 and the force on the spool 28 created by the spring 36. In this regard, the friction force imparted by member 56 of brake 50 must be great enough to overcome the rewind force presented by the spring 36. By this construction, the brake 50 serves to automatically hold the reel 28 in any selected position to provide the desired length of line 14 for support of the hooks 18. Of course, the brake 50 may be released to retract line 14 by simply applying slight upward manual pressure on the lever 52 sufficient to reduce the friction force of member 56 on spool 28 to a point below the critical level.

The hooks 18 are of conventional construction, each having a bent wire loop 58 selectively held in a closed position by a clasp 60 for operation in the manner of a safety pin. A swivel attachment 62 loosely mounts each hook 18 on the line 14 for sliding movement therealong intermediate the aperture 44 in housing 12 and the outermost end 46. Note in this regard that the aperture 44 is sufficiently small to preclude passage of the attachments 62 therethrough, such that the line 14 may be recoiled by the mechanism 16 independently of the hooks 18.

A spring clip 64 is mounted on the housing 12 adjacent the aperture 44 for convenient storage of the hooks 18 when the line 14 is fully retracted. In this regard, the hooks 18 are normally left secured to the clip 14 until such time as they are required for attaching a fish to the line 14.

A headed button 66 extends generally radially from the housing 12 adjacent the aperture 44 to present a convenient tie means for positively securing the line 14 in a desired position such that weight can be supported on the end 46 of line 14 without further withdrawing the line 14 from the housing 12. Thus, the stringer may be adapted for carrying fish from one location to another as desired by the fisherman. It is contemplated that a similar button might also be provided on the uppermost end of the housing 12 to permit various orientations of the line 14 relative to the housing 12 when the stringer 10 is used as a carrier.

The line 14 should be constructed of good quality, heavy duty nylon to withstand repeated retraction and extension without fraying. In this connection, it is also contemplated that a smooth brass eyelet 68 be disposed in the aperture 44 to reduce wear on the line 14. Virtually any length of line 14 may be provided, though as a practical matter it is believed that length in the range of from 50–100 feet would prove satisfactory.

If desired, the housing 12 may be provided with a belt clip such as that shown in FIGS. 3 and 4 of the drawing for permitting the stringer 10 to be easily carried by the fisherman.

INDUSTRIAL APPLICABILITY

The utility and application of the present invention is clearly set forth hereinabove. The stringer 10 is specifically designed for use by fishermen to captively retain fish in the water for temporary storage until such time as they may be conveniently cleaned and refrigerated or otherwise permanently stored.

When the stringer 10 is in the retracted position, substantially the full length of the line 14 is wound upon the spool 28 with the end 46 being disposed externally of the housing 12 immediately adjacent the aperture 44. Of course, as explained hereinabove, the hooks 18 are preferably engaged by the clip 64 as shown in FIG. 1 to preclude them from becoming entangled with other equipment in the fisherman's tackle box.

When it is desired to use the stringer 10 for retaining fish in the manner explained, the angler merely pulls on the ring 48 to withdraw a desired length of line 14 from the housing 12. If fishing in a boat, this length may be relatively short; if fishing from a remote bank location, fifty feet or more of line 14 may be required. It is understood that normally the desired length of line 14 is that sufficient to permit the end 46 to be immersed within the body of water. Once the line 14 has been extended to the desired length, the brake 50 operates to hold the spool 28 against the biasing of the spring 36, thereby precluding retraction of the line 14 into the housing 12. Of course, in the form shown, the housing 12 is rendered stationary by imbedding the spike 24 in the ground at a desired location.

As fish are caught by the angler, he simply removes a hook from its retained position in engagement with the clip 64, attaches the fish to the hook 18, and tosses the fish back into the water, secure in the knowledge that it is captively retained by the line 14. This operation is repeated each time a new fish is caught with the captured fish being collected in the water adjacent end 46 for preventing spoilage.

When the fisherman desires to move to a new location, he simply retrieves his fish from the water by pulling on line 14 and then recoils the extra length of line 14 into the housing 12 by releasing the brake 50. He may wrap a part of the line 14 around button 66 one or two turns to securely hold the line against either extension or retraction, thereby permitting him to easily carry his catch by merely holding onto the housing 12.

From the foregoing, it can be seen that the present invention offers a unique solution to a problem which has long plaqued fishermen in general, and particularly those who are accustomed to fishing from remote bank locations. The stringer 10 is easily stored without entanglement and permits temporary storage of fish in the water even from distal locations. An additional advantage of the stringer 10 is that sufficient line 14 may be provided to permit captured fish to swim to cooler depths.

We claim:

1. A fish stringer comprising:
    a rotatable spool;
    a length of flexible line having a portion thereof normally wound about said spool and being selectively extensible from said spool;
    a plurality of fish-holding elements each including
        a line-engaging portion for securing the element to said line and for allowing the element to slide freely along the entire length of said line from the outermost end thereof to said spool; and
        an elongated, relatively flat fish-holding portion coupled to said line-engaging portion,
    said plurality of fish-holding elements being cooperatively configured and arranged for compact, side-by side abutment of said fish-holding portions during storage of the elements when the latter are not in use.

2. The fish stringer as set forth in claim 1 including a housing disposed about said spool.

3. The invention of claim 2 and structure precluding said elements from entering said housing.

4. The invention of claim 2 and mounting means for holding said housing stationary.

5. The invention of claim 1 and recoil means including and a spring yieldably biasing said spool in the retracting direction of rotation.

6. The invention of claim 5; said recoil means having a releasable brake for retaining said spool against the biasing of said spring.

7. The invention of claim 6; said brake including a yieldable lever and friction increasing means held against said spool by said lever.

8. The invention of claim 2; and a line tie on the outside of said housing for permitting said line to be secured in the retracted position.

9. The invention of claim 2; and a clip on said housing for releasably holding said securements thereagainst.

10. A fish stringer comprising:
    an elongated line;
    means for receiving coils of said line for allowing a portion of the line to be selectively extended from and wound about said line-receiving means;
    a plurality of fish-holding elements each including,
        a line-engaging portion for securing the element to said line and for allowing the element to slide freely along the entire length of said line from the outermost end thereof to said spool; and
        an elongated, relatively flat fish-holding portion coupled to said line-engaging portion,
    means proximal to said line-receiving means for storing said fish-holding elements in a side-by-side, abutting engagement.

* * * * *